US008983066B2

(12) United States Patent
Kruys et al.

(10) Patent No.: US 8,983,066 B2
(45) Date of Patent: Mar. 17, 2015

(54) PRIVATE PAIRWISE KEY MANAGEMENT FOR GROUPS

(75) Inventors: Johannes Petrus Kruys, Harmelen (NL); David McGrew, Poolesville, MD (US); Max Pritikin, Madison, WI (US); Joseph Salowey, Seattle, WA (US); Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1284 days.

(21) Appl. No.: 12/431,291

(22) Filed: Apr. 28, 2009

(65) Prior Publication Data

US 2010/0220856 A1    Sep. 2, 2010

Related U.S. Application Data

(63) Continuation-in-part of application No. 12/394,847, filed on Feb. 27, 2009.

(51) Int. Cl.
*H04L 29/06* (2006.01)
*H04L 9/08* (2006.01)
*H04L 9/32* (2006.01)

(52) U.S. Cl.
CPC ............ *H04L 9/0866* (2013.01); *H04L 9/0833* (2013.01); *H04L 9/321* (2013.01); *H04L 2209/80* (2013.01)
USPC .......................................................... 380/44

(58) Field of Classification Search
CPC ....................................................... H04L 9/0833
USPC ............................................................ 380/44
See application file for complete search history.

(56) References Cited

U.S. PATENT DOCUMENTS

| 4,322,577 | A | 3/1982 | Brandstrom |
| 6,240,188 | B1 * | 5/2001 | Dondeti et al. ............... 380/284 |
| 6,530,020 | B1 * | 3/2003 | Aoki .............................. 713/163 |
| 6,584,566 | B1 * | 6/2003 | Hardjono ...................... 713/163 |
| 6,785,809 | B1 * | 8/2004 | Hardjono ...................... 713/163 |
| 7,171,557 | B2 * | 1/2007 | Kallahalla et al. ........... 713/165 |
| 7,234,058 | B1 | 6/2007 | Baugher et al. |
| 7,234,063 | B1 * | 6/2007 | Baugher et al. ............... 713/189 |
| 7,328,343 | B2 * | 2/2008 | Caronni ........................ 713/171 |
| 7,350,227 | B2 | 3/2008 | McGrew et al. |
| 7,395,423 | B1 * | 7/2008 | Dondeti et al. ............... 713/151 |
| 7,418,100 | B2 | 8/2008 | McGrew et al. |
| 7,509,491 | B1 | 3/2009 | Wainner et al. |

(Continued)

OTHER PUBLICATIONS

Donggang et al.; Group-based key predistribution for wireless sensor networks; Journal ACM Transactions on Sensor Networks (TOSN) TOSN Homepage archive vol. 4 Issue 2, Mar. 2008 Article No. 11; ACM Digital Library.*

(Continued)

*Primary Examiner* — Bradley Holder
(74) *Attorney, Agent, or Firm* — Tucker Ellis LLP

(57) ABSTRACT

In an example embodiment, a key generation system (KGS) is used to generate private pairwise keys between peers belonging to a group. Each member of the group is provisioned with a set of parameters which allows each member to generate a key with any other member of the group; however, no group member can derive a key for pairings involving other group members. The private pairwise keys may be used to derive session keys between peers belonging to the group. Optionally, an epoch value may be employed to derive the private pairwise keys.

19 Claims, 4 Drawing Sheets

(56) References Cited

U.S. PATENT DOCUMENTS

| | | | |
|---|---|---|---|
| 7,813,510 B2 * | 10/2010 | Fu | 380/279 |
| 7,869,890 B2 * | 1/2011 | Sharma et al. | 700/84 |
| 7,978,858 B2 * | 7/2011 | Osajima et al. | 380/277 |
| 8,204,228 B2 * | 6/2012 | Weis et al. | 380/277 |
| 8,792,646 B2 * | 7/2014 | Tinnakornsrisuphap et al. | 380/278 |
| 2003/0056114 A1 | 3/2003 | Goland | |
| 2003/0081784 A1 * | 5/2003 | Kallahalla et al. | 380/277 |
| 2004/0083363 A1 * | 4/2004 | Hengeveld et al. | 713/163 |
| 2005/0032506 A1 * | 2/2005 | Walker | 455/411 |
| 2005/0063542 A1 | 3/2005 | Ryu | |
| 2005/0204161 A1 * | 9/2005 | Caronni | 713/201 |
| 2006/0184999 A1 | 8/2006 | Guichard et al. | |
| 2006/0193473 A1 * | 8/2006 | Fu | 380/277 |
| 2007/0016663 A1 | 1/2007 | Weis | |
| 2007/0094374 A1 * | 4/2007 | Karia et al. | 709/223 |
| 2007/0209071 A1 | 9/2007 | Weis et al. | |
| 2007/0274525 A1 * | 11/2007 | Takata et al. | 380/270 |
| 2008/0058968 A1 * | 3/2008 | Sharma et al. | 700/84 |
| 2009/0060189 A1 * | 3/2009 | Osajima et al. | 380/259 |
| 2009/0083536 A1 | 3/2009 | Weis et al. | |
| 2009/0245517 A1 * | 10/2009 | Tinnakornsrisuphap et al. | 380/270 |
| 2010/0050204 A1 * | 2/2010 | Wang et al. | 725/31 |
| 2010/0054479 A1 * | 3/2010 | Kao et al. | 380/279 |
| 2010/0142711 A1 * | 6/2010 | Weis et al. | 380/277 |
| 2010/0220856 A1 | 9/2010 | Kruys | |

OTHER PUBLICATIONS

Zhen et al.; A robust group-based key management scheme for wireless sensor networks; Wireless Communications and Networking Conference, 2005 IEEE (vol. 4 ) Date of Conference: Mar. 13-17, 2005; pp. 1915-1920 vol. 4; IEEE Xplore.*

Blom, Rolf, "An Optimal Class of Symmetric Key Generation Systems," Ericsson Radio Systems AB, S-163 80 Stockholm, Sweden.

Blundo, Carlo et al., "Perfectly-Secure Key Distribution for Dynamic Conferences".

Espacenet Search Result List Sep. 2011.

Ramkumar, Mahalingam, "Trustworthy Computing under Resource Constraints with the DOWN Policy", IEEE Transactions on Dependable and Secure Computing, vol. 5, No. 1. Jan.-Mar. 2008.

* cited by examiner

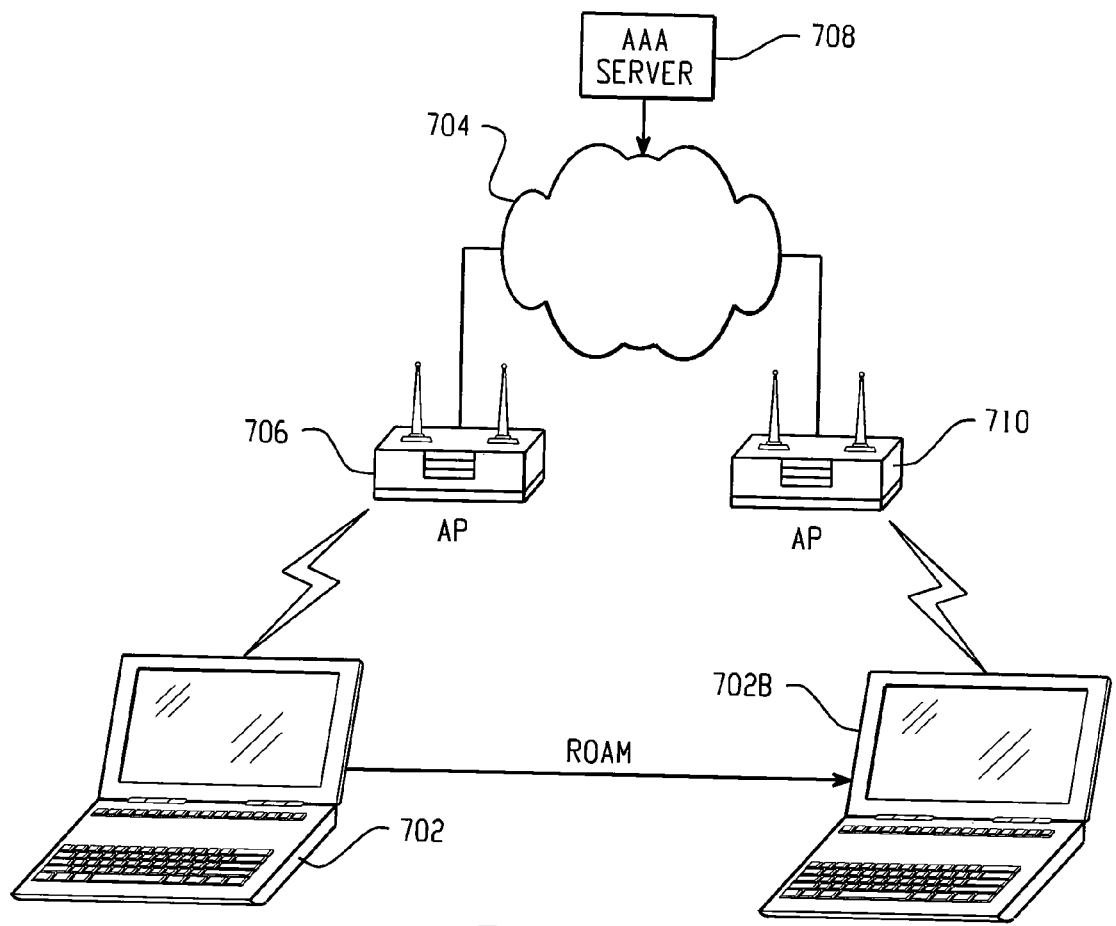
Fig. 7
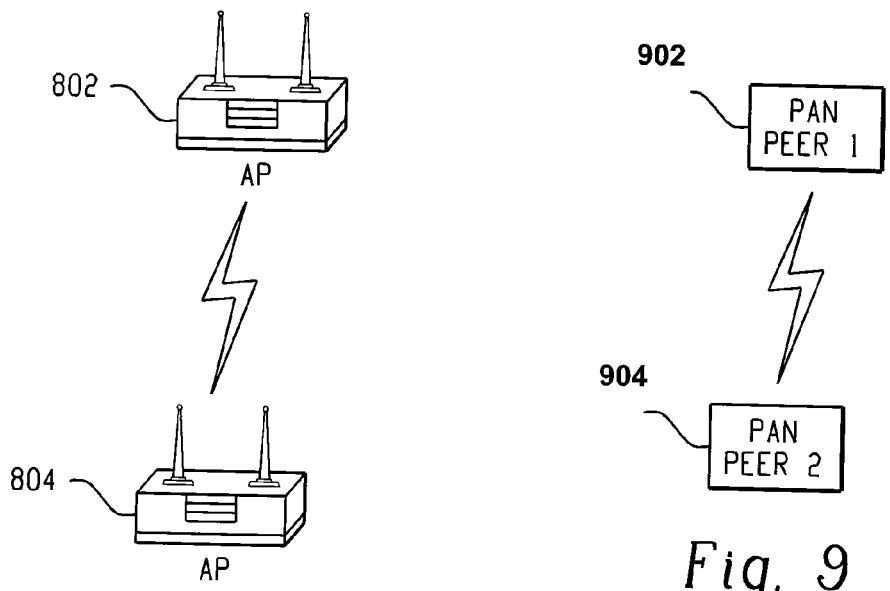
Fig. 8
Fig. 9

PRIVATE PAIRWISE KEY MANAGEMENT FOR GROUPS

CROSS-REFERENCE TO RELATED APPLICATIONS

This application is a continuation-in-part of U.S. application Ser. No. 12/394,847, filed on Feb. 27, 2009.

TECHNICAL FIELD

The present disclosure relates generally to a technique for establishing keys between wireless peers for authentication, authorization and link protection.

BACKGROUND

Mesh networks may be deployed to support the needs of municipalities and public safety and other groups of users that use a network to stay in contact. Members of the mesh network must be able to perform authentication, authorization and key management in order to maintain the integrity, confidentiality and availability of the mesh. Some current security schemes include pairwise shared secrets, shared secrets with a key server, certificates and key pairs, and group key. In a pairwise shared secret scheme, each pair of mesh participants (peers) shares a secret, which does not scale well. For shared secrets using a key server, each mesh participant shares a secret with a key server, which facilitates key exchange and authentication between mesh participants (for example Kerberos, Authorization, Authentication and Accounting "AAA" employ such as scheme). Shared secrets with a key server depend on the accessibility of the key server and therefore they can fail if the key server is not available for an period of time that exceeds the lifetime of cached shared secrets. For certificates and key pairs, each mesh participant is provisioned with a certificate and key pair allowing mesh participants to authenticate with each other; however, this solution can have a negative impact on performance and battery life, and may require deployment and management of some level of a public key infrastructure (asymmetric cryptography solutions such as elliptic curve cryptography "ECC" or "Rivest-Shamir-Adleman RSA" are examples of certificate and public key systems). A group key system involves all mesh nodes sharing the same key, which can allow any member of the mesh network to impersonate any other member without collusion, and revocation requires a complete rekey.

BRIEF DESCRIPTION OF THE DRAWINGS

The accompanying drawings incorporated herein and forming a part of the specification illustrate the examples embodiments.

FIG. 7 illustrates an example a device employing a key generating system for authenticating with a wireless network.

FIG. 8 illustrates an example of an example of a pair of access points employing a key generating system for authenticating within a mesh network.

FIG. 9 illustrates an example of an example of a pair of devices employing a key generating system for authenticating within a wireless personal area network.

OVERVIEW OF EXAMPLE EMBODIMENTS

Figure 1:
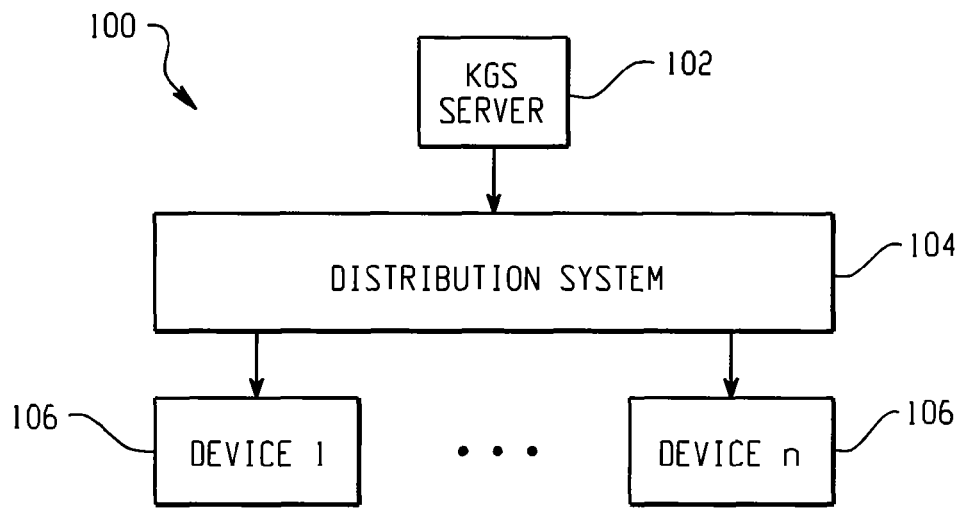
FIG. 1 illustrates an example of a system for managing private pairwise keys among group members.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a transceiver and logic in communication with the transceiver. The logic is configured to receive data corresponding to keying material derived from a symmetric key generation system for a predefined group. The logic is responsive to a signal received from a device via the transceiver indicating the device is a member of the predefined group to generate a session key based on the data corresponding to keying material for the predefined group and an identifier for the device. The identifier may optionally indicate the authorization level or role of the device. The keying material comprises an epoch value.

In accordance with an example embodiment, there is disclosed herein a method comprising receiving data for a symmetric key generation system group, the data comprising data representative of an identity of the symmetric key generation system group, data representative of a public identifier, and data representative of a secret key. Upon detecting another member of the symmetric key generation system group, identifiers are exchanged with the other member. A pairwise master key is derived based on the secret key and the identifier of the other member. A session key is derived from the pairwise master key.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Described herein in an example embodiment is a scheme that provides for the establishment of a secure group identity that is expressed by means of a set of crypto variables that form proof of membership to a given group. Such a group may have a public group name to distinguish it from other groups. This set of variables, also known as a peer identity, comprises a secret key and a public (member) identifier. The secret key together with another peer's identifier is used to generate a shared key using a key generation system (KGS) function. This shared key has the interesting property that the compromise of one or a few secret keys does not lead to exposure of all members of the group. As used herein, the public identifier may also be referred to as the KGS identifier.

The example embodiments described herein provide a method that allows any two members of a KGS group to establish (or re-establish) a secure link between them. The example embodiments are not limited by type of station. For example the two stations can be access points, mesh network nodes, wireless stations, etc. In particular embodiments, the KGS group scheme is employed as a means of generating session keys between two network entities where the group identity serves as the equivalent of a master key from which pairwise session keys can be derived.

In an example embodiment, when individual devices of the group are provisioned with crypto variables, each device may also be given a nonce which may be used to permute the KGS shared secret.

Examples herein will illustrate the use of a KGS crypto key management and distribution protocol that can be employed for implementing fast handoff, e.g. the Institute of Electrical and Electronic Engineers "IEEE" 802.11 (hereinafter 802.11) Amendment r ("802.11r"), mesh networking, e.g 802.11 Amendment s (802.11s"), or a wireless personal area network ("PAN" such as BLUETOOTH). In these embodiments, group parameters are stored instead of per-device state. This can reduce the amount of data stored by devices within the networks such as access points (APs) in 802.11 networks, peers in Mesh networks, and by the PAN controller in a wireless PAN implementation. Battery operated devices may benefit from the example embodiments described herein because storage of state information is largely avoided and complex public key computations are avoided.

Referring now to FIG. 1, there is illustrated an example of a system 100 for managing private pairwise keys among group members. A KGS server 102 is employed to generate the keying material for devices 106. KGS server 102 may suitably comprise logic for deriving the keying material. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, KGS server 102 derives pairwise keys in accordance with a symmetric KGS. An example of such as system is described in Blom, An Optimal Class of Symmetric key generation systems, Advances in Cryptology: Proceedings of Eurocrypto 84, Lecture Notes in Computer Science, Vol. 209, Springer-Verlag, Berlin (1984), pp. 335-338. In the aforementioned system, each participant in a group is provisioned with a set of parameters (e.g. keying materials) which allows each participant to derive a key to communicate with any other member of the group. There is a threshold value n (an integer), where n participants can collude to derive keys for other participants in the group, but n−1 or fewer participants cannot do so. Therefore, n should be larger than the number potential colluding adversaries; however, the larger the number n, the larger the amount of data each member of the group must store. For example, if using 128 bit keys and a threshold of n=4 colluding adversaries, approximately 512 bits (64 bytes) of base storage is used (not including pairwise keys generated on demand). Thus, during parameter generation, KGS server 102 selects a parameter for n for the desired level of security, and generates the parameters for each member (devices 106) of the group.

After generating the parameters KGS server 102 distributes the parameters to devices 106 via distribution system 104. The parameters distributed to each member (peer) of the group is unique to that member. In an example embodiment, each member is authenticated and authorized to communicate with KGS server 102. The communication used by distribution system 104 for distributing the parameters employs confidentiality and integrity protection.

In an example embodiment, devices (1 . . . n) 106 connect with a central authority to receive their parameters. For example devices 106 may be authenticated and authorized with KGS server 102 to receive the parameters, or KGS server 102 may communicate the parameters to distribution system 104 which authenticates and authorizes devices 106 and distributes the parameters. The parameters may be distributed in-band or out-of-band with devices 106. Some possible mechanisms for distributing the parameters to devices 106 include but are not limited to out of band over a secure link, as part of an IEEE 802.1X (hereinafter "802.1X") exchange with an Extensible Authentication Protocol (EAP) exchange such as EAP-FAST, as part of an 802.1X exchange protected by key material derived from EAP, as part of an 802.11i four way handshake inside a key descriptor or other secured data structure, and/or through a higher layer protocol that leverages Layer (L) 2 security or provides its own security.

Figure 2:
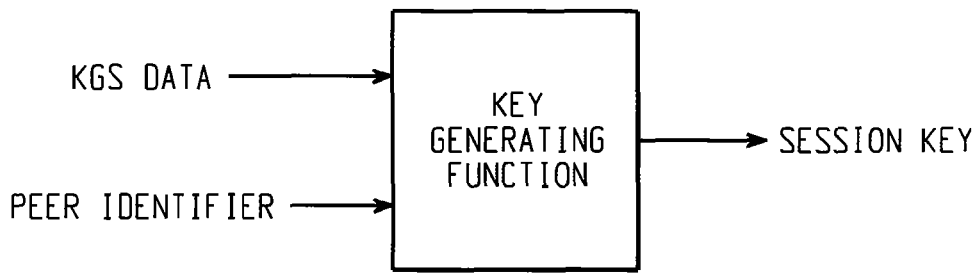
FIG. 2 illustrates an example of a system for implementing key generation among group members to derive a session key.
Figure 3:
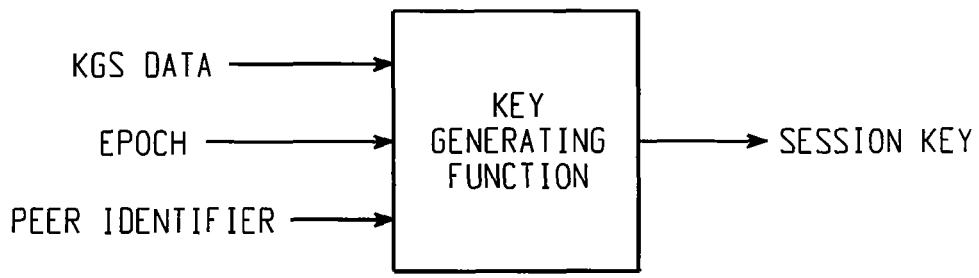
FIG. 3 illustrates an example of a system employing an epoch for implementing key generation among group members to derive a session key.

After distribution of the parameters, any two members of the group can establish a session key for secure communications. In order to establish a session key, two devices 106 (peers) exchange identifiers or otherwise learn each others identifiers. For example, in one embodiment, the Medium Access Control (MAC) address can be employed as the identifier. A device (peer) initiating the connection can ascertain the MAC address from beacon and/or probe frames or other frames received from the target device. The target device receives the initiating device's MAC address when the initiating device communicates with the target device. In another example embodiment, a predefined field may be employed in a frame for communicating KGS peer identifier data. FIG. 2 illustrates an example of a system for implementing key generation among group members to derive a session key. KGS data derived by KGS server 102 and the peer identifier for the other device are employed to derive a session key. FIG. 3 illustrates an example of a system employing that also employs an epoch for key generation. In another example embodiment, the peer identifier provided to the key generating function in FIG. 2 comprises an epoch value.

In an example embodiment, two peers (e.g. two devices 106) may perform peer to peer authentication by a first peer (e.g. device 1) 106 contacting a second, target peer (e.g. device n) 106. Both peers (e.g. device 1 and device n) 106 exchange identifiers. Each peer then uses a key generating function (for example one of the key generating functions illustrated in FIG. 2 or FIG. 3) to generate a pair-wise key. Peers (device 1 and device n) 106 use the generated keys to authenticate and potentially exchange keys for link protection.

In an example embodiment, to guard against peers exchanging spoofed identities, exchanging identities and any key exchanges should be protected by an authenticated protocol such as for example an enhancement to the 802.11s peer link establishment protocol where the PMK (Pairwise Master Key) is derived using the key generating system, an enhancement to 802.11i 4-way handshake where PMK is derived using the key generating system and/or use of an 802.1X and an EAP method that bases authentication from keys derived from the key generating system (such as EAP-TLS-PSK "Extensible Authentication Protocol-Transport Layer Security-Pre-Shared Key" or EAP-GPSK "Extensible Authentication Protocol-Generalized Pre-Shared Key").

In an example embodiment, different parameters could be distributed to indicate different roles, privileges or entitlements. For example a device may have one set of parameters for initiating a connection and another set of parameters when the device is the target device.

In an example embodiment, peer identities used by KGS server 102 could be derived from addresses, in which case there is no need for an identity exchange. It may also be possible to do away with a "handshake" between the peers; e.g. when a wireless device sees a particular SSID, it could know that it should use a particular KGS when communicating with other devices using the network parameters associated with that SSID. Alternately, it may be desirable to retain a "handshake" protocol so that two devices can agree on other parameters, e.g. which KGS to use. KGS server 102 also may assign identifiers to each peer, as part of their unique parameters (described herein supra). These identifiers are used when generating pairwise keys. KGS server 102 ensures that each identifier is unique. Alternately, KGS server 102 could allow each peer to choose its own identifier, and it could merely verify the uniqueness of the identifiers. Alternatively, the KGS could indicate authorization level or role information in the identifier.

In an example embodiment, when a peer reboots, it is desirable to have it use a different set of keys than it was using prior to the reboot. This can be beneficial because it avoids all of the issues associated with the re-use of keys, such as replay attacks and counter re-use in CTR (counter mode) and GCM (Galois Counter Mode), and keystream reuse in stream ciphers such as RC4 (Rivest Cipher 4). A simple way to provide new keys after a reboot is to include a nonce in each identifier; that is, each identifier includes a value that ensures that it is distinct from all other identifiers that have ever been assigned. For example, an "epoch" value could be included in each identifier, and the "epoch" could be incremented when needed. This epoch value can provide the nonce needed to avoid key re-use after a device reboots. In particular embodiments, each peer needs to know the identifier of each other peer, so when a nonce is included in the identifier, it must be available to the receiver of traffic encrypted via keys generated by the key generating service. Note that this distribution of a new identity can be done as part of the authorization process. When a new identity is given to a device that device must be given a new set of KGS keys. In example embodiments, revocation can be performed by distributing lists of revoked identities or by issuing new parameters. Both of these processes can be integrated into authentication process and supplemented by additional protocols as necessary.

Figure 4:
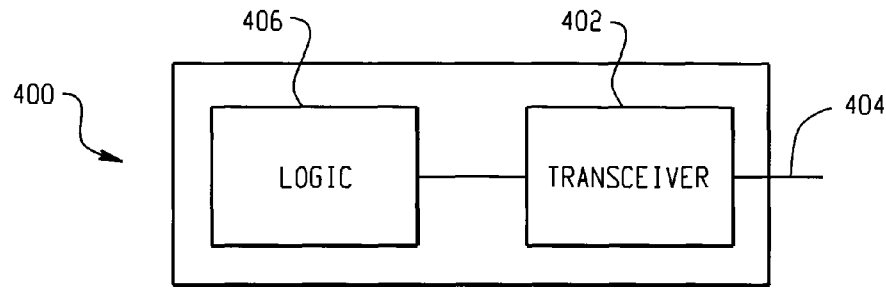
FIG. 4 illustrates an example of a device for implementing an example embodiment.

FIG. 4 illustrates an example of a device 400 for implementing an example embodiment. Device 400 is suitable for implementing devices 106 in FIG. 1. Device 400 comprises a transceiver 402 suitable for sending and/or receiving data on a link 404. Link 404 may be a wired or wireless link, and transceiver 402 may be a wired or wireless transceiver. Logic 406 is coupled to transceiver 402 and configured to send and/or receive data from link 404 via transceiver 402.

In an example embodiment, logic 406 is configured to receive data corresponding to keying material derived from a symmetric key generation system for a predefined group via link 404. The data may be received in-band (via transceiver 402) or out-of-band (for example manually entered data, data 'burned in' at the factory or received from some other means other than transceiver 402).

In an example embodiment, logic 406 is responsive to a signal received from a device (not shown, see for example FIGS. 6-9) via the transceiver 402 indicating the device is a member of the predefined group to generate a session key. The session key is generated based on the data corresponding to keying material for the predefined group and an identifier for the device.

In an example embodiment, the keying material comprises an epoch value. Logic 406 may be operable to update the epoch value and generate a new session key based on updated epoch value. Logic 406 is operable to send the updated epoch value to the device via transceiver 402. If device 400 is communicating with a plurality of devices, the logic 406 is operable to send the updated epoch value to the plurality of devices via the transceiver. Alternatively, logic 406 may receive the updated epoch value from the device, in which case logic 406 will generate a new session key based on the updated epoch value. The epoch value may be sent/received as part of the identifier for the other device and/or be sent/received as a Nonce. In particular embodiments, logic 406 is operable to update the epoch value after a predetermined time period. In an example embodiment, logic 406 is operable to update the epoch value during boot up.

In an example embodiment, logic 406 is operable to broadcast data indicating device 400 is a member of the predefined group. This data may be included in a beacon frame, a probe request frame and/or a probe response frame with data.

In an example embodiment, logic 406 is operable to determine whether the other device is a member of the predefined group from data received from the other device via transceiver 402. The data may be included in a beacon frame, a probe request frame and/or a probe response frame received via the transceiver 402 from the device.

In an example embodiment, logic 406 is configured with data corresponding to keying material for a plurality of predefined groups. When associating with another device, logic 406 is responsive to determining if the other device is a member of one of the plurality of predefined groups. If the other device is a member of one of the plurality of predefined groups, logic 406 is operable to generate a session key for communicating with the other device. The session key is based on data corresponding to keying material for the group that the other device is a member and an identifier for the device. In particular embodiments, where device 400 and the other device belong to a plurality of groups common to both devices, logic 406 is operable to communicate with the device via transceiver 402 enabling both devices to agree or select one of the plurality of predefined groups for communicating. This may allow both devices to generate a session key based on data corresponding to the selected group.

In an example embodiment, logic 406 verifies that the other device possesses the same session key. This may protect against spoofed identity attacks. If the other device does not possess the same session key then communication with that device can be terminated and/or other action may be taken to alert a network administrator a rogue device is trying to gain access using spoofed credentials.

Figure 5:
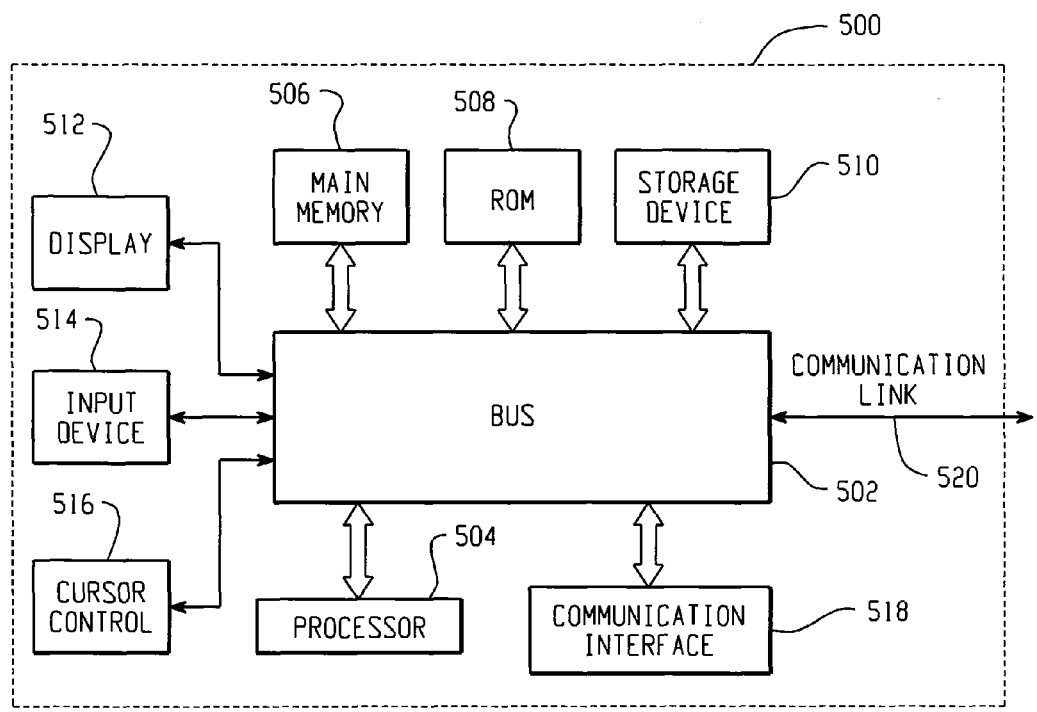
FIG. 5 illustrates a computer system upon which an example embodiment may be implemented.

FIG. 5 illustrates a computer system 500 upon which an example embodiment may be implemented. For example computer system 500 may be employed to implement the logic of KGS server 102 and/or device 106 (FIG. 1), and/or device 400 (FIG. 2). Computer system 500 may also be employed to implement the key generating function illustrated in FIGS. 3 and 4.

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512 such as a cathode ray tube (CRT) or liquid crystal display (LCD), for displaying information to a computer user. An input device 514, such as a keyboard including alphanumeric and other keys is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g. x) and a second axis (e.g. y) that allows the device to specify positions in a plane. Input device 514 may be employed for manually entering keying data.

An aspect of the example embodiment is related to the use of computer system 500 for private pairwise key management for groups. According to an example embodiment, private pairwise key management for groups is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media and volatile media. Non-volatile media include for example optical or magnetic disks, such as storage device 510. Volatile media include dynamic memory such as main memory 506. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other media from which a computer can read.

Computer system 500 also includes a communication interface 518 coupled to bus 502. Communication interface 518 provides a two-way data communication coupling computer system 500 to a communication link 520 that is employed for communicating with other devices belonging to a predefined group. Computer system 500 can send messages and receive data, including program codes, through a network via communication link 520, and communication interface 518.

Figure 6:
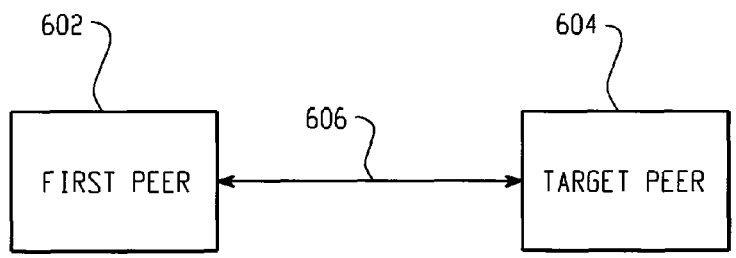
FIG. 6 illustrates an example of a pair of devices belonging to a group authenticating employing symmetric key generating system.

FIG. 6 illustrates an example of a pair of devices 602, 604 belonging to a group authenticating employing symmetric key generating system. Devices 602, 604 are coupled by a communication link 606. Communication link 606 may suitably comprise a wireless link, a wired link or a combination of wired and wireless links. Devices 602, 604 receive data representative of keying material for a group of devices from an external source such as KGS server 102 (FIG. 1) or other external means as described herein supra. The data representative of keying material is unique to each device in the group. For example, data possessed by device 602 is unique to device 602 and allows it to establish a secure link with device 604. Similarly, device 604 possesses data representative of keying material for the group that is unique to device 604 and enables device 604 to communicate with any other member of the group, such as device 602. In particular embodiments, devices 602, 604 exchange identities. The identities may be the MAC addresses for each device, or identifiers corresponding to a particular group that both devices 602, 604 are members.

For example, first device (peer) 602 discovers target device (peer) 604 on link 606 whereupon devices 602, 604 may exchange data to determine whether they belong to a common group that employs a symmetric key generation system. Device 602 determines an identifier for device 604 and device 604 determines an identifier for device 602. The devices can then generate a key. In particular embodiments, the key is a master key (such as a Pairwise Master Key "PMK") from which a session key (such as a Pairwise Transient Key "PTK") may be derived. Devices 602, 604 may further employ an epoch and/or nonce. For example, the identifiers used by devices 602, 604 may include an epoch value used for generating session keys. Alternatively, devices 602, 604 exchange nonces which are employed to generate session keys. Devices 602, 604 may securely communicate on link 606 after deriving the session key. In particular embodiments, devices 602, 604 may be further configured to verify both devices possess the same session key.

FIG. 7 illustrates an example of a device 702 employing a key generating system for authenticating to gain access to a wireless network 704. In an example embodiment, as wireless device 702 associates with a first access point (AP) 706, wireless device is authenticated with authentication (AAA) server 708. Upon successfully authenticating, authentication server 708 can provide wireless device 702 with data corresponding to KGS keying material for authenticating with members of a group which can include APs 706, 710. After receiving the group credentials, logic in wireless device 702 can authenticate with APs 706, 710 by deriving session keys via a KGS (for example a symmetric KGS) using the group credentials, without involving AAA server 708. For example, when wireless device 702 roams to location 702B, wireless device 702 can mutually authenticate with AP 710 by performing a key exchange with the group credentials. Wireless device 702 can determine if AP 710 belongs to the group from data provided by AP 710 in beacon frames and/or probe request and/or response frames. In an example embodiment, wireless device 702 and APs 706, 710 may use their MAC addresses as the identifier for generating keys. For example AP 706 may use its own MAC address and the MAC address of wireless device 702 for generating a session key. In particular embodiments, group members such as AP 706 and wireless device 702 may also exchange nonces for generating session keys.

In an example embodiment, logic in AP 710 and wireless device 702 generate a pairwise master key for the AP 710 based on the data corresponding to keying material derived from the symmetric key generation system for the group and an identifier for the second access point. In particular embodiments, for example an embodiment employing 802.11 compatible protocol, logic in AP 710 and wireless device 702 are further operable to generate a session key based on the pairwise master key derived for communications between AP 710 and wireless device 702, a Medium Access Control (MAC) address for AP 710, a nonce generated by AP 710, a MAC address for wireless device 702, and a nonce generated by logic in wireless device 702.

FIG. 8 illustrates an example of a pair of access points 802, 804 employing a key generating system for authenticating within a mesh network. Prior to authenticating with each other access points 802, 804 receive data corresponding to keying material for a KGS group. The data may be received in-band, e.g. via their wireless transceivers, or out-of-band, e.g. manual entry, factory assigned data, etc. Access points 802, 804 upon encountering each other, exchange signals to determine whether they belong to a common group. If access points 802, 804 belong to more than one common group, they may agree which group to employ for authentication purposes.

Upon determining a group for access points 802, 804, logic in each access point 802, 804 generates a key using data corresponding to the keying material and an identifier for the other access point. For example, AP 802 would generate a key based on the group keying material and data an identifier for AP 804. In another example embodiment, AP 802 may also exchange nonces with AP 804 and use the nonces for generating the key. Alternatively, the identifier for each AP 802, 804 may comprise nonce data and/or data identifying the role of the device. Once APs 802, 804 verify they both have the same session key, secure communications may occur between them.

FIG. 9 illustrates an example of a pair of devices 902, 904 employing a key generating system for authenticating within a wireless Personal Area Network (PAN) such as a PAN employing the BLUETOOTH protocol. Prior to authenticating with each other access points 902, 904 receive data corresponding to keying material for a KGS group. The data may be received in-band, e.g. via their wireless transceivers, our out-of-band, e.g. manual entry, factory assigned data, etc. Access points 902, 904 upon encountering each other, exchange signals to determine whether they belong to a common group. If access points 902, 904 belong to more than one common group, they may agree which group to employ for authentication purposes.

Upon determining a group for access points 902, 904, logic in each access point 902, 904 generates a key using data corresponding to the keying material and an identifier for the other access point. For example, AP 902 would generate a key based on the group keying material and data an identifier for AP 904. In yet another embodiment, AP 902 may also exchange nonces with AP 904 and use the nonces for generating the key. Alternatively, the identifier for each AP 902, 904 may comprise nonce data and/or data identifying the role of the device. Once APs 902, 904 verify they both have the same session key, secure communications may occur between them.

Figure 10:
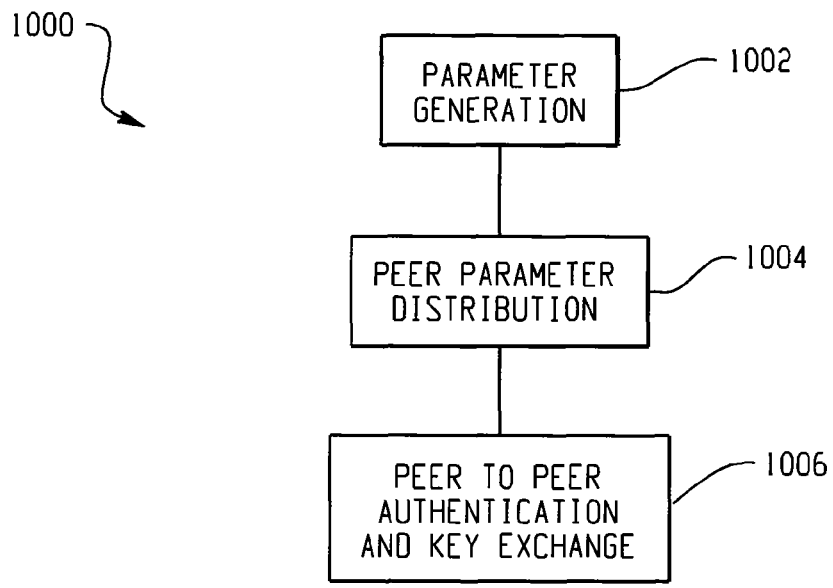
FIG. 10 illustrates an example of a methodology for managing private pairwise keys for a group.
Figure 11:
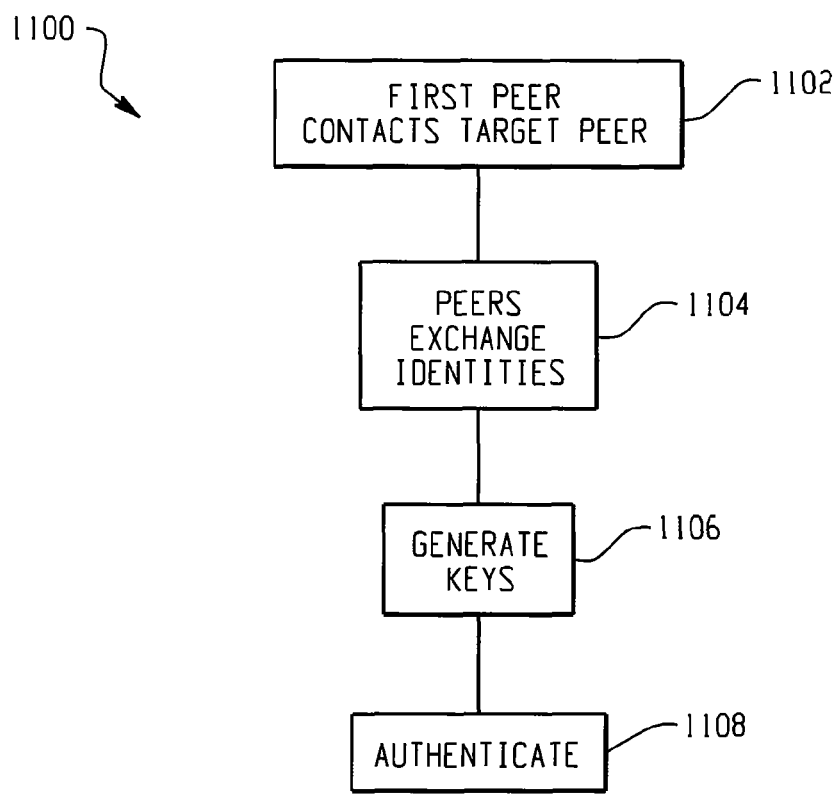
FIG. 11 illustrates an example of an example of a method for peers to mutually authenticate employing a key generating system.

In view of the foregoing structural and functional features described above, methodologies in accordance with example embodiments will be better appreciated with reference to FIGS. 10 and 11. While, for purposes of simplicity of explanation, the methodologies of FIGS. 10 and 11 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

FIG. 10 illustrates an example of a methodology 1000 for managing private pairwise keys for a group. Methodology 1000 provides for the establishment of a secure group identity that is expressed by means of a set of crypto variables that form proof of membership to a given group. Such a group may have a public group name to distinguish it from other groups. This set of variables, also known as a peer identity, comprises a secret key and a public (member) identifier. The secret key together with another peer's identifier is used to generate a shared key using a key generation system (KGS) function. This shared key has the interesting property that the compromise of one or a few secret keys does not lead to exposure of all members of the group. As used herein, the public identifier may also be referred to as the KGS identifier. For example, a KGS system can be employed where n (where n is an integer greater than 2) users must collaborate to derive a key between two members of the group, but less than n users cannot.

At 1002, parameters are generated for the group. A level of security is selected. For example, a number n is selected indicating the number of other users that must collaborate to derive a key between a pair of members.

At 1004, the parameters are distributed to group members (peers). Each peer is provisioned with parameters unique to it so that others can generate keys for use with that peer. To do this provision, a peer is authenticated and authorized and the communication used for distributing the parameters is confidentiality and integrity protected. In an example embodiment, the peer is connected with a trusted, central authority. Once parameters are distributed, connectivity with the trusted authority is no longer required). Some possible mechanisms for distributing the parameters to peers securely include: but are not limited to a) out of band over a secure link; b) as part of an 802.1X protocol exchange within an EAP (Extensible Authentication Protocol) exchange such as EAP-FAST (Extensible Authentication Protocol-Flexible Authentication via Secure Tunneling); c) as part of an 802.1X exchange within 802.1X protected by key material derived from; EAP; d) as part of a 802.11 compatible protocol 4 way handshake inside a key descriptor or other secured data structure and/or e) through some higher layer protocol that leverages Layer 2 security or provides it own security.

At 1006, peer to peer authentication and key exchange occurs between members of the group. In order to establish a session key, two peers exchange identifiers or otherwise learn each others identifiers. For example, in one embodiment, the Medium Access Control (MAC) address can be employed as the identifier. A peer initiating the connection can ascertain the MAC address from beacon and/or probe frames or other frames received from the target device. The target device receives the initiating device's MAC address when the initiating device communicates with the target device. In another example embodiment, a predefined field may be employed in a frame for communicating KGS peer identifier data. FIG. 2 illustrates an example of a system for implementing key generation among group members to derive a session key. KGS data derived by KGS server 102 and the peer identifier for the other device are employed to derive a session key. FIG. 3 illustrates an example of a system employing that also employs an epoch for key generation. In another example embodiment, the peer identifier provided to the key generating function in FIG. 2 comprises an epoch value.

In an example embodiment, two peers may perform peer to peer authentication by a first peer contacting a second, target peer. Both peers exchange identifiers. Each peer then uses a key generating function (for example one of the key generating functions illustrated in FIG. 2 or FIG. 3) to generate a pairwise key. Peers use the generated keys to authenticate themselves and exchange keys for link protection.

In an example embodiment, to guard against peers exchanging spoofed identities, exchanging identities and any key exchanges should be protected by an authenticated protocol such as for example an enhancement to the 802.11s peer link establishment protocol where the PMK (Pairwise Master Key) is derived using the key generating system, an enhancement to the 802.11i 4-way handshake where PMK is derived using the key generating system and/or use of an 802.1X and an EAP method that bases authentication from keys derived from the key generating system (such as EAP-TLS-PSK "Extensible Authentication Protocol-Transport Layer Security-Pre-Shared Key" or EAP-GPSK "Extensible Authentication Protocol-Generalized Pre-Shared Key").

In an example embodiment, different parameters could be distributed to indicate different roles, privileges or entitlements. For example a peer may have one set of parameters for initiating a connection and another set of parameters when the peer is the target device.

In an example embodiment, peer identities used by the KGS could be derived from addresses, in which case there is no need for an identity exchange. It may also be possible to do away with a "handshake" between the peers; e.g. when a wireless device sees a particular SSID, it could know that it should use a particular KGS when communicating with other devices using the network parameters associated with that SSID. Alternately, it may be desirable to retain a "handshake" protocol so that two peers can agree on other parameters, e.g. which KGS to use. The KGS also may assign identifiers to each peer, as part of their unique parameters (described herein supra). These identifiers are used when generating pairwise keys. the KGS ensures that each identifier is unique. a KGS could allow each peer to choose its own identifier, and it could merely verify the uniqueness of the identifiers. Alternatively, the KGS could indicate authorization level or role information in the identifier.

In an example embodiment, when a peer reboots, it is desirable to have it use a different set of keys than it was using prior to the reboot. This can be beneficial because it avoids all of the issues associated with the re-use of keys, such as replay attacks and counter re-use in CTR (counter mode) and GCM (Galois Counter Mode), and keystream reuse in stream ciphers such as RC4 (Rivest Cipher 4). A simple way to provide new keys after a reboot is to include a nonce in each identifier; that is, each identifier includes a value that ensures that it is distinct from all other identifiers that have ever been assigned. For example, an "epoch" value could be included in each identifier, and the "epoch" could be incremented when needed. In particular embodiments, each peer needs to know the identifier of each other peer, so when a nonce is included in the identifier, it must be available to the receiver of traffic encrypted via keys generated by the key generating service. Note that this distribution of new identity can be done as part of the authorization process. In example embodiments, revocation can be performed by distributing lists of revoked identities or by issuing new parameters. Both of these processes can be integrated into authentication process and supplemented by additional protocols as necessary.

FIG. 11 illustrates an example of an example of a method 1100 for peers to mutually authenticate employing a symmetric key generating system (KGS). Prior to implementing methodology 1100, the peers are provisioned with data corresponding to keying material for a group that the peers are members. Each peer is provisioned with private data that enables it to establish a secure communication link with any other member of the group. A method such as methodology 1000 can be employed to provision the peers.

At 1102 a first peer (initiator) contacts a peer (target peer) to establish a link. For example, the initiator peer may send a probe request frame or any other suitable data to establish a link between the initiator peer and a target peer.

At 1104, the peers exchange identities. The identities may be special group identifiers created just for the group, or generic identifiers such as MAC addresses. In the cast of a special identity, a protocol may be employed to facilitate the exchange of peer identities. In the case where MAC addresses are employed, the peers may learn the identifier for each other when communication is establish, e.g. through beacon frames and/or probe request and/or response frames.

At 1106, each peer generates a key for the link. Each peer would employ a suitable algorithm with the private data corresponding to the group and the identifier of the other peer to derive the key. For example, the target peer would derive a key using private data available only to the target peer and the identifier for the initiator peer. In an example embodiment, the peers would use both peer identities (initiator and target) for generating the key. In an example embodiment, the peers may also employ nonces or an epoch value generating the key.

At 1108, the peers mutually authenticate each other. Each peer determines that the other peer has derived the same key. For example, the initiator peer determines whether the target peer is using the same symmetric key as the initiator peer, and the target peer determines whether the initiator is using the same symmetric key. Upon successful authentication, a secure, mutually authenticated link is established between the initiator peer and the target peer.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
 a transceiver; and
 logic in communication with the transceiver;
 wherein the logic is configured to receive data corresponding to keying material derived from a symmetric key generation system for a plurality of predefined groups;
 wherein the logic is responsive to a signal received from an associated device via the transceiver indicating the associated device is a member of a first set of groups in common with the plurality of predefined groups to communicate with the associated device via the transceiver to select, together with the associated device, a selected group from the first set of groups as agreed between the apparatus and the associated device, and to generate a session key based on data corresponding to keying material for the selected group, an identifier of the associated device, and a parameter identifying the associated device as an initiator of a connection between the associated device and the apparatus;

wherein the logic is configured to authenticate the associated device by communicating to the associated device, via the transceiver, a parameter identifying the apparatus as a target of the connection between the associated device and the apparatus and determining that the associated device possesses the session key.

2. The apparatus of claim 1, wherein the keying material includes an epoch value.

3. The apparatus of claim 2, wherein the logic is configured to update the epoch value and generate a new session key based on the updated epoch value.

4. The apparatus of claim 3, wherein the logic is configured to send the updated epoch value to the associated device via the transceiver.

5. The apparatus of claim 3, wherein the transceiver is in communication with a plurality of associated devices, the logic being configured to send the updated epoch value to the plurality of associated devices via the transceiver.

6. The apparatus of claim 3, wherein the logic is configured to update the epoch value after a predetermined time period.

7. The apparatus of claim 3, wherein the logic is configured to update the epoch value during boot up.

8. The apparatus of claim 3, wherein the logic is configured to send data to the associated device to update the session key upon receipt of the updated epoch value.

9. The apparatus of claim 1, wherein the logic is configured to broadcast one of a group consisting of a beacon frame, a probe request frame and a probe response frame with data representative of the selected group.

10. The apparatus of claim 1, wherein the logic is configured to determine whether the associated device is a member of the selected group from one of a group consisting of a beacon frame, a probe request frame and a probe response frame received via the transceiver from the associated device.

11. The apparatus of claim 1, wherein the logic is configured with data corresponding to the keying material for the plurality of predefined groups.

12. The apparatus of claim 1, wherein the transceiver is a wireless transceiver.

13. The apparatus of claim 12, wherein:
the logic is configured to authenticate with an authentication server by communicating with a first access point via the wireless transceiver; and
the logic is configured to receive the data corresponding to the keying material derived from the symmetric key generation system for the plurality of predefined groups from the authentication server via the wireless transceiver.

14. The apparatus of claim 13, wherein:
the logic is configured to determine the wireless transceiver has roamed and is communicating with a second access point to determine whether the second access point belongs to a predefined group; and the logic is configured to generate a pairwise master key for the second access point based on the data corresponding to the keying material derived from the symmetric key generation system for the plurality of predefined groups and an identifier for the second access point.

15. The apparatus of claim 14, wherein the logic is further configured to generate a second session key for communicating with the second access point based on the pairwise master key for the second access point, a Medium Access Control address for the second access point, a nonce received from the second access point, a Medium Access Control address for the wireless transceiver, and a nonce generated by the logic sent to the second access point.

16. A method in a device, the method comprising:
receiving, by a transceiver of the device, data for a plurality of symmetric key generation system groups, the data comprising data representative of identities of the plurality of symmetric key generation system groups, data representative of a public identifier, and data representative of a secret key;
detecting another member belonging to a set of groups in common with the plurality of symmetric key generation system groups;
exchanging identifiers with the another member;
selecting, by logic of the device and together in an agreement with the another member, a first symmetric key generation system group from the set of groups in common with the plurality of symmetric key generation system groups for communicating with the another member;
deriving a pairwise master key based on data corresponding to the selected first symmetric key generation system group, the data representative of the secret key, an identifier of the another member, and a parameter identifying the another member as an initiator of a connection between the another member and the device;
deriving a session key from the pairwise master key; and
authenticating the another member by communicating to the another member via the transceiver a parameter identifying the device as a target of the connection between the another member and the device and determining that the another member possesses the session key.

17. The method set forth in claim 16, wherein the session key is derived from the pairwise master key, a Medium Access Control address associated with the transceiver, a nonce associated with the transceiver, a Medium Access Control address associated with the another member, and a nonce received from the another member.

18. The method set forth in claim 16, wherein:
the data corresponding to the selected first symmetric key generation system group further comprises an epoch value; and
the deriving a pairwise master key is based on the secret key, the identifier of another member and the epoch value.

19. The method set forth in claim 16, wherein the detecting the another member belonging to the set of groups in common with the plurality of symmetric key generation system groups comprises receiving data representative of at least one symmetric key generation system group membership from the another member.

* * * * *